United States Patent
Bradfield

(10) Patent No.: US 8,269,384 B2
(45) Date of Patent: Sep. 18, 2012

(54) ALTERNATOR WITH DUAL AXIAL AIR FLOW

(75) Inventor: Michael D. Bradfield, Anderson, IN (US)

(73) Assignee: Remy Technologies, LLC, Pendleton, IN (US)

( * ) Notice: Subject to any disclaimer, the term of this patent is extended or adjusted under 35 U.S.C. 154(b) by 240 days.

(21) Appl. No.: 12/763,859

(22) Filed: Apr. 20, 2010

(65) Prior Publication Data

US 2011/0254392 A1    Oct. 20, 2011

(51) Int. Cl.
*H02K 9/00* (2006.01)
*H02K 9/06* (2006.01)

(52) U.S. Cl. ............... 310/59; 310/58; 310/60 R

(58) Field of Classification Search .......... 310/52, 310/58–59, 60 R
See application file for complete search history.

(56) References Cited

U.S. PATENT DOCUMENTS

| | | | | |
|---|---|---|---|---|
| 1,477,773 | A * | 12/1923 | Schou et al. | 310/433 |
| 4,918,343 | A | 4/1990 | Heinrich et al. | |
| 5,214,325 | A * | 5/1993 | Matson et al. | 310/58 |
| 5,890,460 | A | 4/1999 | Ball et al. | |
| 6,087,746 | A | 7/2000 | Couvert et al. | |
| 6,636,137 | B1 * | 10/2003 | Neuenschwander | 336/90 |
| 2001/0022482 | A1 | 9/2001 | Leyvraz et al. | |
| 2002/0092152 | A1 * | 7/2002 | Asao et al. | 29/596 |
| 2002/0149273 | A1 * | 10/2002 | Soitu et al. | 310/58 |
| 2003/0094865 | A1 | 5/2003 | Sugitani | |
| 2004/0245883 | A1 * | 12/2004 | Mitcham et al. | 310/216 |
| 2007/0210662 | A1 | 9/2007 | Bradfield | |
| 2009/0033161 | A1 | 2/2009 | Bradfield | |

FOREIGN PATENT DOCUMENTS

JP     59113431 A  *  6/1984

* cited by examiner

*Primary Examiner* — Quyen Leung
*Assistant Examiner* — Jose Gonzalez Quinones
(74) *Attorney, Agent, or Firm* — Maginot, Moore & Beck

(57) ABSTRACT

A vehicle alternator comprises a rotor and a stator positioned within a housing. The housing includes a front face, a rear face, and a outer wall extending between the front face and the rear face. The front face includes a plurality of air inlet holes, and the rear face including a plurality of air outlet holes. The outer wall is void of air holes that extend through the outer wall. The rotor is positioned within the housing and configured to rotate about an axis. The stator is positioned within the housing between the rotor and the outer wall of the housing. The stator includes a core with an outer surface, a front end and a rear end. A plurality of substantially axial air passages are positioned between the outer wall of the housing and the outer surface of the stator core.

20 Claims, 6 Drawing Sheets

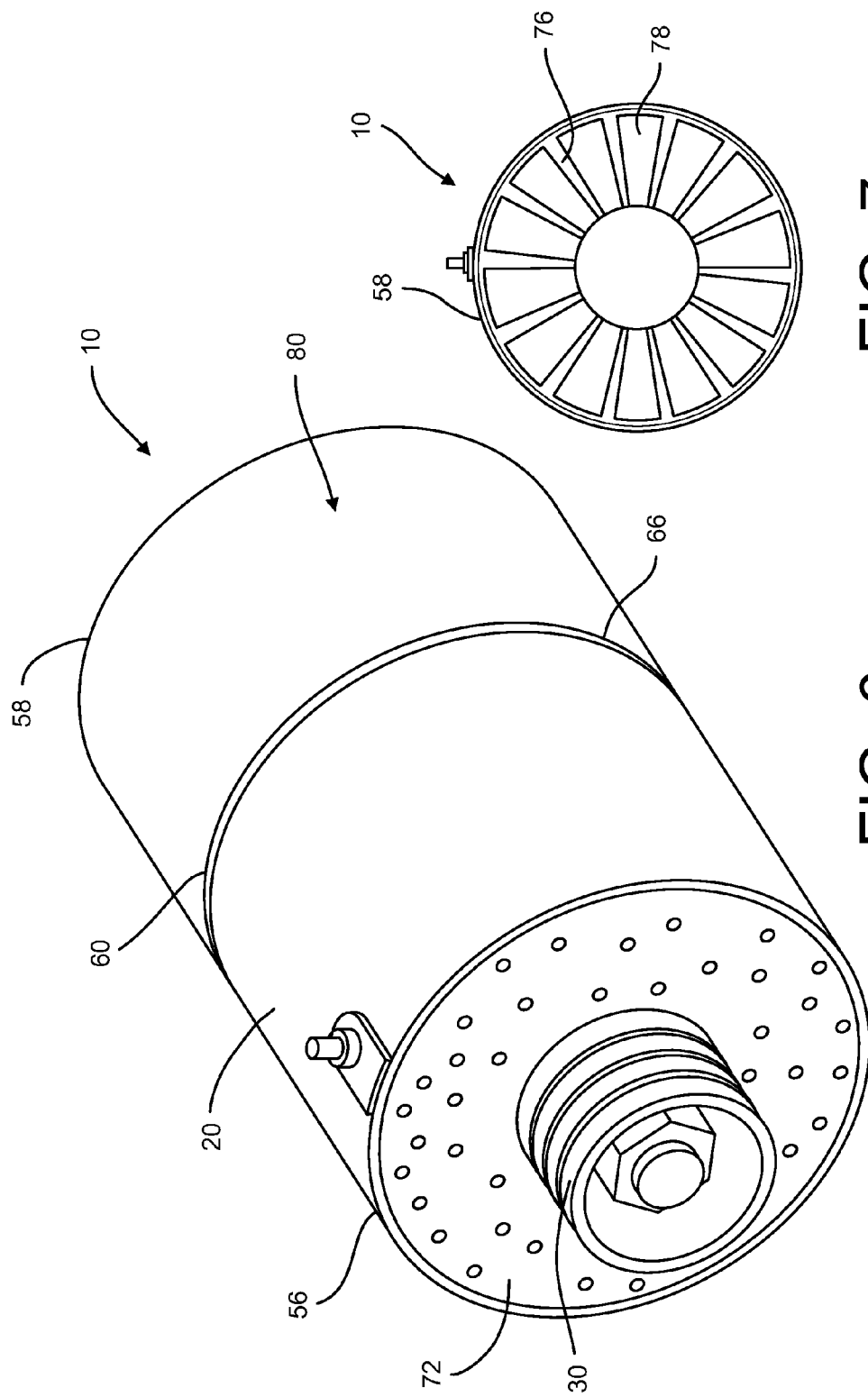

US 8,269,384 B2

ALTERNATOR WITH DUAL AXIAL AIR FLOW

FIELD

This disclosure relates generally to electric machines. More specifically, this disclosure relates to cooling of vehicle electrical power generators.

BACKGROUND

Underhood airflow in a vehicle is from the front of the vehicle to the rear due to motion of the vehicle and the action of radiator cooling fans disposed at the front of the vehicle. In contrast, however, cooling air typically enters an electric machine, for example, an alternator, at or near the rear of the alternator. Air typically enters into the alternator through various input ports at the rear or the sides of the alternator and then flows in a generally axial direction toward the front of the alternator. As the air flows toward the front of the alternator, the air is heated by the alternator components. The heated air is expelled from the alternator, combines with the underhood airflow, and is then carried back to the rear of the alternator where at least a portion of the heated air is recirculated through the alternator. Depending on the alternator configuration, as much as 30-35% of the heated air is recirculated through the alternator, raising the temperature of the cooling air entering the alternator 20-30 degrees C. The increased temperature of the cooling air results in a reduction of the cooling capability of the air and may have a negative impact on alternator performance. Accordingly, it would be desirable to provide an alternator with an improved cooling arrangement that results in increased cooling capacity and increased alternator performance.

SUMMARY

An electric machine for a vehicle comprises a housing, a rotor positioned within the housing, and a stator positioned within the housing between the rotor and an outer wall of the housing. The stator includes a core with a front end, and a rear end, an inner portion and an outer portion surrounding the inner portion. The stator further includes stator windings positioned on the inner portion of the stator core. The electric machine includes a plurality of substantially axial air passages extending from the front end to the rear end of the stator core. The plurality of substantially axial air passages are positioned between the inner portion of the stator core and the housing.

Pursuant to another embodiment of the disclosure, there is provided a method of cooling an electric machine in a vehicle. The method includes receiving an inlet stream of air through a first end of the electric machine. The method further includes splitting the inlet stream of air into a first stream of air and a second stream of air flowing through the electric machine. The first stream of air flows between an outer surface of a stator core and a non-porous outer wall of a housing. The second stream of air flows through a rotor positioned radially inward from the stator core. The method also includes exhausting the first stream of air and the second stream of air through a second end of the electric machine.

In accordance with yet another embodiment of the disclosure there is provided an alternator comprising a rotor and a stator positioned within a housing. The rotor is configured to rotate about an axis, and the stator positioned radially outward from the rotor. The stator includes a stator core with an outer surface that extends from a front end to a rear end of the stator core. The housing includes a non-porous outer wall positioned between a front face with a plurality of air inlet holes and a rear face with a plurality of air outlet holes. A plurality of air passages are positioned between the outer wall of the housing and the outer surface of the stator core. Each of the air passages extend from the front end to the rear end of the stator core.

The above described features and advantages, as well as others, will become more readily apparent to those of ordinary skill in the art by reference to the following detailed description and accompanying drawings. While it would be desirable to provide an electric machine that provides one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

FIG. 6 shows a front end perspective view of a housing for the alternator of FIG. 1; and FIG. 7 shows a rear end view of the housing of FIG. 6.

DESCRIPTION

Figure 1:
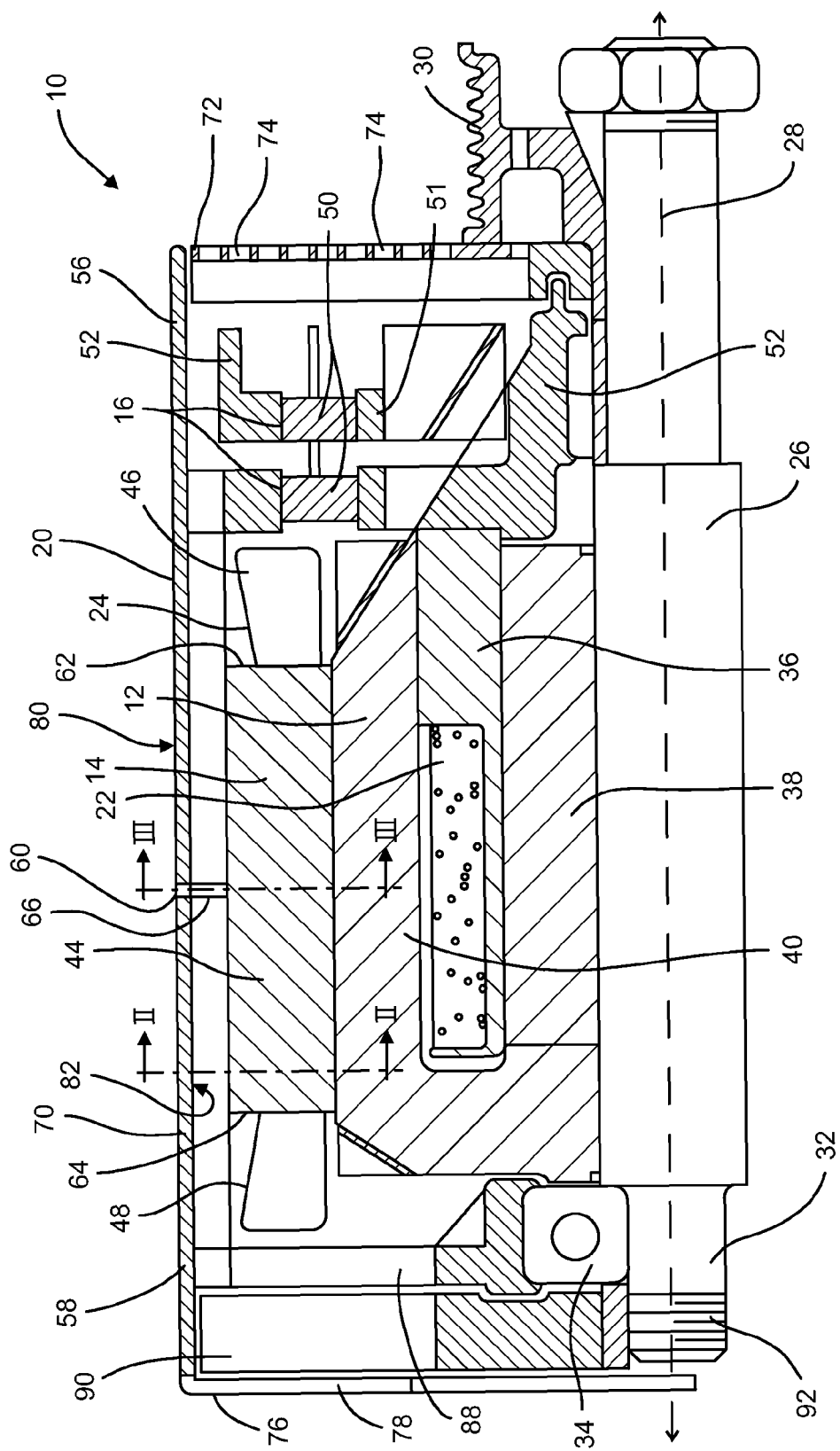
FIG. 1 shows a cross-sectional view of one half of an alternator with dual axial airflow.

With reference to FIG. 1, in at least one embodiment an electric machine for a vehicle is provided in the form of an alternator 10. The alternator 10 includes a rotor 12, a stator 14, a rectifier 16, and a voltage regulator (not shown), all carried by a housing 20. The rotor 12 includes a field coil 22 that is configured to induce an AC stator output in stator windings 24. The stator windings 24 are connected to the rectifier 16, which converts the AC stator output to a DC output that is used to charge a vehicle battery. The voltage regulator monitors the system voltage and adjusts the output of the alternator by controlling the current through the field coil.

One embodiment of the rotor 12 and stator 14 arrangement is shown in the embodiment of FIG. 1. In this embodiment, the rotor 12 is operably connected to a belt-driven shaft 26. The rotor 12 and shaft 26 are configured to rotate about a shaft axis 28. One end of the shaft 26 is connected to a pulley 30 that engages the belt (not shown). An opposite end of the shaft 26 includes a journal 32 that engages a bearing 34 retained by the housing 20.

In the embodiment of FIG. 1, the field coil 22 of the rotor 12 is wound about a spool 36 which encircles an iron core 38. Opposing claw-pole segments 40 surround the field coil 22 radially outward from the field coil 22. Both the claw-pole segments 40 and the iron core 38 are configured to rotate with the shaft 26. The field coil 22 is configured to produce an electro-magnetic field when current flows through the field coil 22 during operation of the electric machine. The electro-magnetic field results a plurality of alternating N and S magnetic poles on the segments 40 of the rotor. When the shaft 26 is rotated, the rotor 12 provides a rotating magnetic field with a plurality of N and S magnetic poles. While the foregoing is one contemplated rotor embodiment for the alternator, it will be recognized that other rotor embodiments are possible.

The stator 18 includes an iron stator core 44 comprised of a stack of flat iron sheets typically referred to as "laminations" or "lams". The lams include a set of front lams 62, a set of rear lams 64, and a set of center lams 66. The front lams 62 and rear lams 64 are identical in shape. The general perimeter shape of the rear lams 64 can be seen with reference to the cross-sectional view of FIG. 2, which shows the shape of a rear lam 64 positioned within the housing 20. The rear lam 64 includes an inner portion 67 and related surface where the teeth 54 of the stator core are positioned. The rear lam also includes an outer portion 68a where a cylindrical outer surface is defined.

Figure 2:
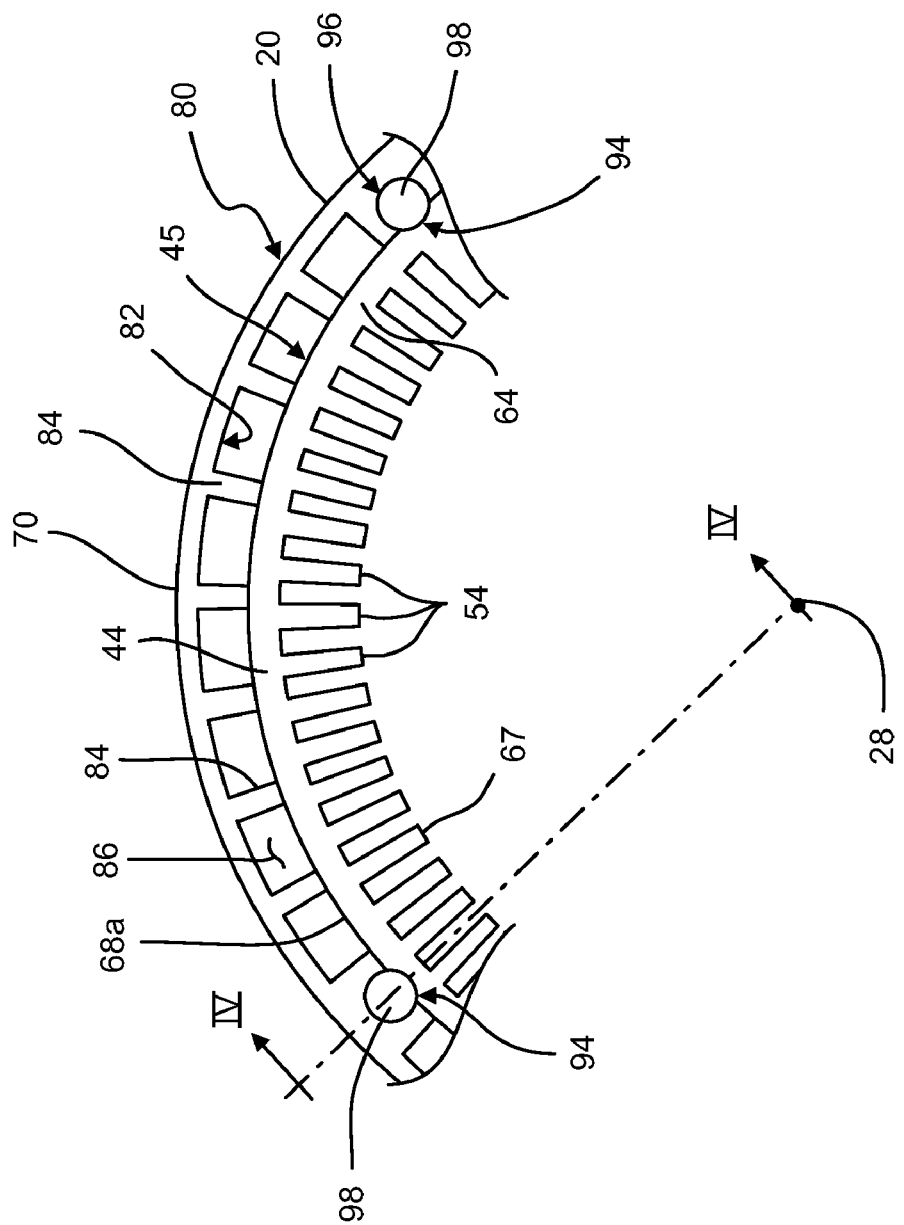
FIG. 2 shows a cross-sectional view of a stator core and housing of the alternator of FIG. 1 along line II-II.
Figure 3:
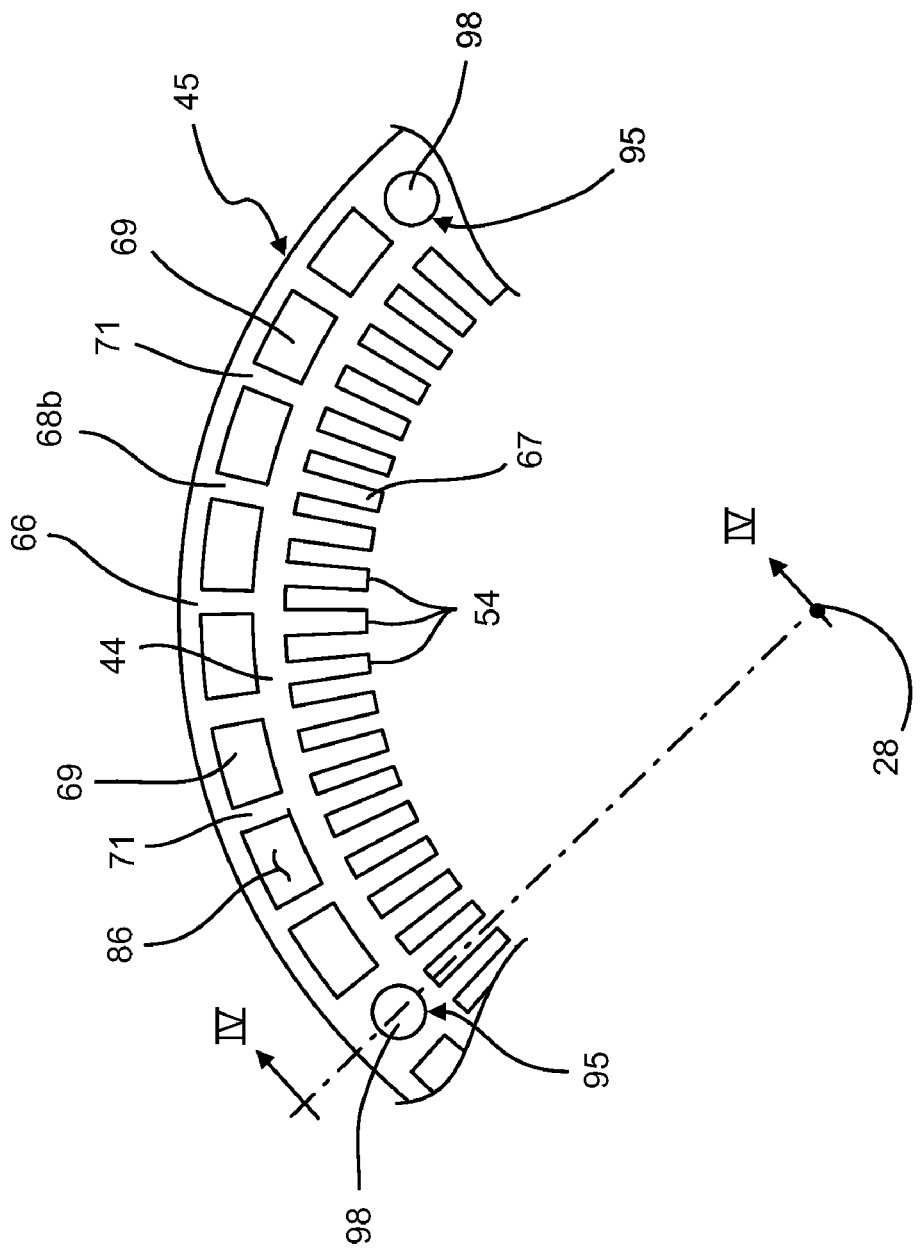
FIG. 3 shows a cross-sectional view of a stator core of the alternator of FIG. 1 along line III-III.

In contrast to the shape of the rear lams shown in FIG. 2, the general perimeter shape of the center lams 66 can be seen with reference to the cross-sectional view of FIG. 3. As shown in FIG. 3, the center lams 66 are similar in shape to the front and rear lams 62, 64, but include an extended outer portion 68b that surrounds the inner portion 67 where the teeth 54 of the stator core are positioned. This additional outer portion 68b results in the center lams 66 having a larger diameter than the front lams 62 and rear lams 64. The outer portion 68b of each center lam 66 includes a plurality of openings 69 near the outer perimeter separated by radial ribs 71. As a result, the outer portion 68b of each center lam 66 is provided as a perforated disk arrangement that surrounds the inner portion 67 of the center lam 66. The perforated disc includes the openings 69 with a radial rib 71 positioned between adjacent openings. As explained in further detail below, the perforated disk portions 68 of the center lams 66 cooperate with the housing 20 to form axial air passages along the outer portions of the stator core 44.

The front, rear and center lams of the stator core 44 are stacked together to provide a stator core 44 that is generally cylindrical in shape and extends axially along a length of the rotor 12 and circumferentially around the rotor. The outer surface 45 of the stator core 44 is substantially smooth and cylindrical, with an enlarged portion formed in the middle of the stator core 44 by the center lams 66. As explained above, and as shown in FIG. 1, the front and rear lams 62, 64 of the stator core 44 are contained within the housing 20. The center lams 66 of the stator core 44 extend to the outside of the housing 20 at joint 60. The outer surface 45 of the front and rear lams of the stator core 44 may also include a plurality of axial grooves 94 or other indentations that extend axially along the outer cylindrical surface of the stator. As explained in further detail below, the axial grooves 94 are configured to receive fasteners 98 that extend between the stator core 44 and the housing 20 at the front and rear lams 62, 64. The center lams include holes 95 that pass the fasteners 98.

The stator core 44 is configured to retain the stator windings 24 within the plurality of teeth 54 (see FIGS. 2 and 3) formed on the interior portion 67 of the stator core 44. The stator windings 24 include working segments positioned between the teeth, and forward and rear end turns 48 that extend past the stator core 44 and connect the working segments. During operation of the electric machine 10, the rotating magnetic field of the rotor 12 induces an AC voltage in the stator windings 24.

As mentioned previously, the stator windings 24 are connected to the rectifier 16. The rectifier 16 includes a plurality of diodes 50 mounted on metal heat sinks 51 with cooling ribs 52 on the forward end of the alternator. The metal heat sinks 51 may be integrally formed with the housing 20 or may be secured as plates to the housing. The diodes 50 are electrically connected to provide the rectifier, which converts the AC stator output to a DC output. The voltage regulator (not shown) monitors the system voltage and adjusts the output of the alternator by controlling the current through the field coil. The voltage regulator generally includes a plurality of components contained within an electronics package (not shown). In the embodiment disclosed in FIG. 1, the electronics package is mounted on the forward end of the alternator along with the rectifier 16. In at least one embodiment, the electronics package is mounted on one of the heat sinks The stator 14 and rotor 12 are disposed within the alternator housing 20. In at least one embodiment the housing includes a front housing portion 56 and a rear housing portion 58. The alternator 10 is positioned in a vehicle (not shown) such that the front housing 56 substantially faces the front of the vehicle and the rear housing 58 substantially faces the rear of the vehicle. In the disclosed embodiment, the front housing portion 56 does not connect to the rear housing portion 58. Instead, the front and rear housing portions are separated by the outer portions 68 of the center lams 66, which are positioned in the joint 60 between the front housing 56 and rear housing 58. The front housing 56 and/or the rear housing 58 may include one or more of the cooling ribs 52 which act as heat sinks to increase cooling capacity. A leg 88 extends substantially radially inward from the rear housing 28 toward the shaft 14. The leg 88 provides support to the rear bearing 34.

The front housing portion 56 and rear housing portion 58 together provide a substantially cylindrical outer wall 70 of the housing 20. This outer wall 70 is situated between a front face 72 on the forward end of the housing and a rear face 76 on the rear end of the housing. The outer wall 70 extends substantially the entire length of the alternator 10 between the front and rear faces, with the center lams 66 providing the only discontinuity in the outer wall 70 at joint 60. As illustrated in FIGS. 1 and 6, the front face 72 includes one or more holes 74 that provide inlet ports for cooling air to flow into the alternator 10. Similarly, as shown in FIG. 7, the rear face 76 includes one or more holes 78 that provide outlet ports for the cooling air to escape the housing 20. As best shown in FIG. 6, the cylindrical outer wall 70 is non-porous such that it is void of any holes that would allow air to enter into or exit out of the alternator 10. The outer surface of the center lams 66 are also non-porous and void of holes that would allow air to enter into or exit out of the alternator. Accordingly, the flow of air through the alternator 10 is generally contained within the housing 20 from the front end of the alternator to the rear end of the alternator as air flows in a generally axial direction from the front face 72 to the rear face 76.

Figure 4:
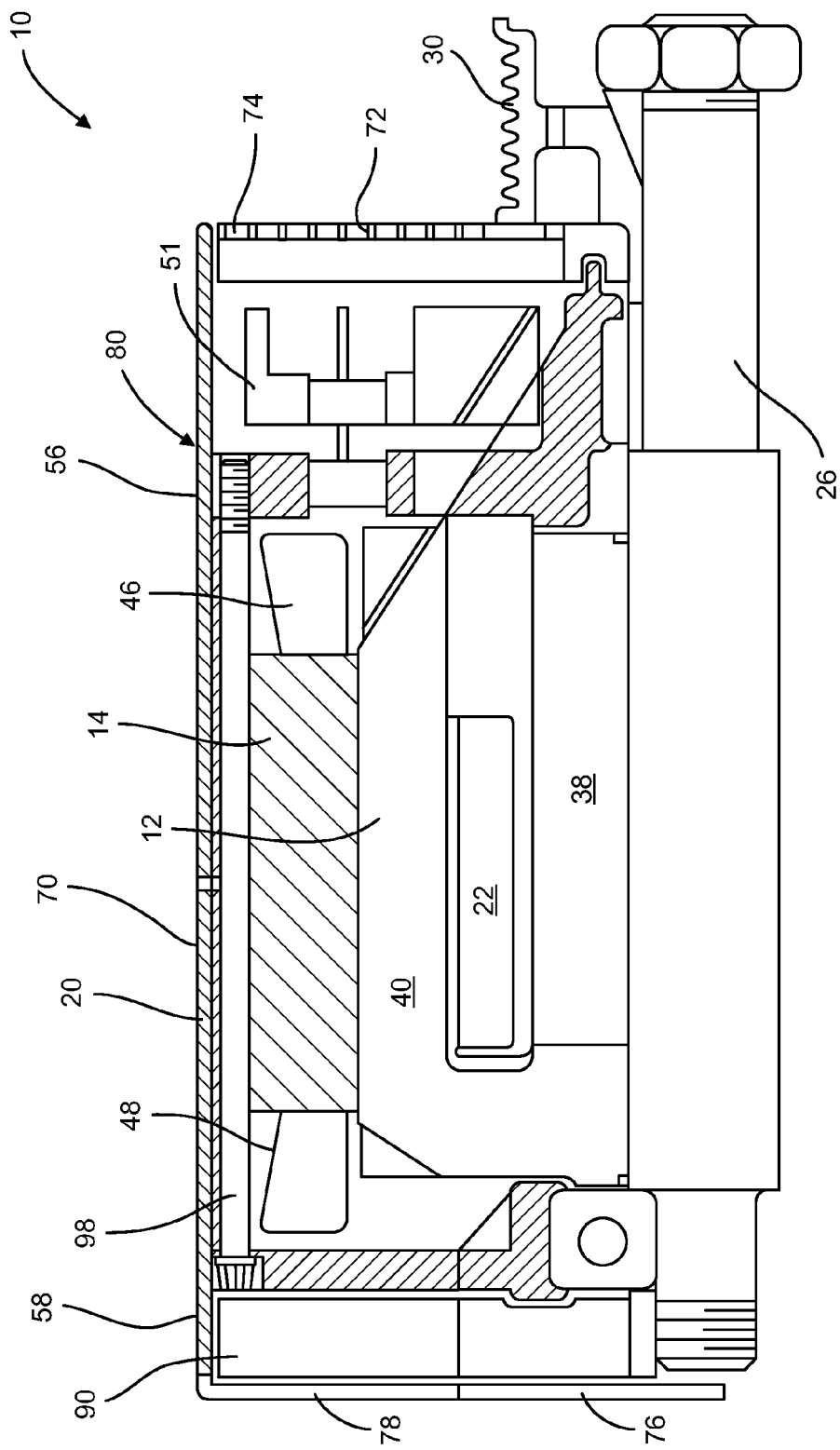
FIG. 4 shows a cross-sectional view one half of the alternator of FIG. 2 along line III-III.

With reference now to FIGS. 2 and 4, the cylindrical outer wall 70 of the housing 20 includes an outer surface 80 and an inner surface 82. The outer surface 80 is generally smooth and regular. By contrast, the inner surface 82 includes a plurality of axial ribs 84 that extend in a radially inward direction and a plurality of axial grooves 96 that cut in to the inner surface 82 of the housing 80 in a radially outward direction. The axial grooves 96 are complimentary to the axial grooves 94 formed on the outer surface 45 of the stator core. Fasteners in the form of elongated bolts 98 are positioned in channels formed by the axial grooves 94 in the outer surface of the stator core and the complimentary axial grooves 96 in the inner surface of the outer wall 70 of the housing 20. These fasteners may be used to connect various components within the housing 20 such as the front and rear housing portions 56, 58. In addition, the bolts 98 also serve to fix the stator core 44 in place within the housing 20.

The axial ribs 84 on the inner surface 82 of the housing 20 extend in the axial direction for approximately the entire length of the housing's outer wall 70. As shown in FIG. 2, the ends of the axial ribs 84 contact the outer surface 45 of the stator core 44. This engagement of the axial ribs 84 with the outer surface 45 of the stator core 44 results in a number of air passages 86 that extend along the outer surface of the stator core 44 between the ribs 84. In the center portion of the stator core 44, the axial ribs 84 are aligned with the ribs 71 of the center lams 66. Accordingly, the openings 69 in the center lams 66 are also aligned with the spaces between the axial ribs 84 such that the air passages 86 in the alternator are substantially free of obstructions and allow cooling air to flow freely within the alternator in an axial direction between the outer surface 45 of the stator core 44 and the inner surface 82 of the housing 20.

In some embodiments, the alternator 10 includes at least one fan 90. In the embodiment shown in FIG. 1, the fan 90 is disposed at a threaded portion 92 of the shaft 26 and is fixed to the shaft 26. The fan 90 is configured to draw air out of the alternator at the rear end of the alternator by creating an area of low pressure at the rear end of the alternator. Although one fan configuration is shown in FIG. 1, it will be recognized that other fan 80 configurations, locations, and attachment methods are contemplated. For example, the fan 80 may be fixed to an unthreaded shaft 26 or could be disposed forward of the rotor 12.

Figure 5:
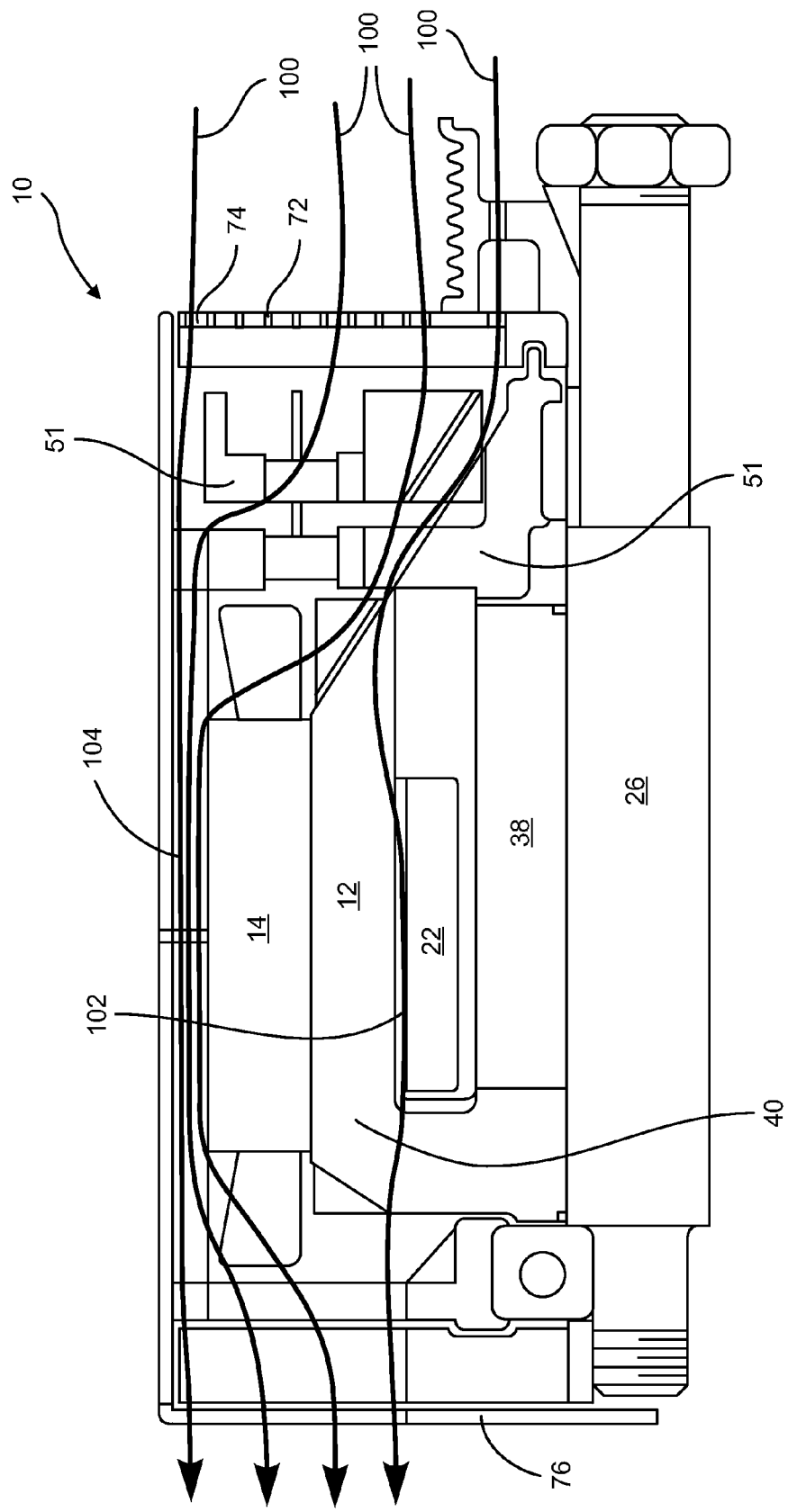
FIG. 5 shows a cross-sectional view of airflow through the alternator of FIG. 1.

During operation of the alternator, the shaft 26 is driven by the belt, resulting in rotation of the rotor 12 and the fan 90. As illustrated in FIG. 5, the fan draws an inlet stream of cooling air 100 into the housing 20 through the holes 74 in the front face 72 of the alternator. Furthermore, the flow of air into the alternator is also facilitated by the natural underhood airflow of the vehicle. It will be appreciated that the front face 72 of the housing 20 acts as a filter to keep large dirt particles and debris out of the alternator while also allowing cooling air to enter into the alternator through the inlet ports 74.

After passing through the front face cooling holes 40, and scrubbing across the heat sinks 51 for the electronics, including the rectifier and the regulator, the inlet air stream 100 is split into two different internal paths as shown by air streams 102 and 104 in FIG. 5. The configuration of the heat sinks 51 helps to split the incoming air stream 100 into the two divergent paths. In particular, the first air stream 102 flows through the rotor and the second air stream 104 flows over the stator.

The first air stream 102 that flows over the rotor 12 is generally conventional in its path. Accordingly, the air stream 102 flows in a generally axial direction into and around the rotor segments 40 and across the field coil 22. The air stream 102 then exits the rotor and passes out of the alternator 10 through the outlet ports 78 on the rear face 76 of the housing. Although this first air stream 102 is described as generally axial, it will be recognized that the rotation of the rotor presents significant flow restrictions to the air stream, resulting in some deviation from a purely axial flow, and generally limiting the amount of cooling air that can be delivered to alternator components.

The second air stream 104 also flows in a generally axial direction, but unlike the first air stream 102, the second air stream 104 is not restricted by rotor rotation. In particular, the second air stream 104 flows through the air channels 86 formed between the axial ribs 84 that extend radially inward from the outer wall 70 of the housing and contact the outer surface 80 of the stator core 44. The air channels 86 also extend through the openings 89 in the center lams 66 of the stator core 33. These unobstructed passages 86 that extend along the outer portions 68a and 68b of the stator core 44 are completely removed from rotor obstructions and allow significant amounts of cooling air to pass over the stator and through the alternator, thereby lowering the operating temperature of components within the alternator 10. Furthermore, it will be recognized that the axial ribs 84 also provide additional surface area on the alternator housing 20 which promotes cooling of the alternator, and particularly the stator 14.

It will be recognized that this split path cooling arrangement is different from a conventional air stream where all of the air flows through the rotor. In particular, the additional air channels 86 between the outer surface and the stator 14 and the inner surface of the housing provide passages for axial airflow which are not obstructed by rotation of the rotor 12. These additional passages 86 retain all the cooling air that enters the passages since there are no air inlets or exits along the outer wall 70 of the housing. The only air holes provided in the housing 20 are the holes provided on the front and rear faces.

After passing over the rotor 12 and stator 14, the first and second air streams 102, 104 are recombined on the rear side of the stator. This heated exhaust air is then urged away from the alternator 10 by the fan 90 in the natural direction of underhood airflow toward the rear of the vehicle. By directing cooling air through the alternator 10 in the manner described above, a larger volume of cooling air is passed over the alternator components, and heated air is not recirculated into the alternator 10. This provides for improved thermal performance of the alternator 10. Furthermore, the cooling scheme includes a front face filter that provides protection against thermal contaminates and debris entering the alternator.

The embodiment described herein in FIGS. 1-7 is but one of numerous alternative embodiments that are contemplated. For example, although center lams 66 are described herein as being different from the front and rear lams 62, 64, in other exemplary embodiments the center lams may be the same as the front and rear lams. Accordingly, it should be recognized that the foregoing detailed description of embodiments of an alternator with dual axial air flow has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:
1. An electric machine for a vehicle comprising:
a housing;
a rotor positioned within the housing and configured to rotate about an axis;
a stator positioned between the rotor and an outer wall of the housing, the stator including a core comprising a front end, a rear end, an inner portion and an outer portion surrounding the inner portion, the stator further including stator windings positioned on the inner portion of the stator core; and
a plurality of substantially axial air passages extending from the front end to the rear end of the stator core, the plurality of substantially axial air passages positioned between the inner portion of the stator core and the housing,
wherein the substantially axial air passages extend through openings formed in the outer portion of center laminations of the stator core, the center laminations positioned between a front portion of the housing and a rear portion of the housing; and
wherein the front portion of the housing includes a plurality of elongated axial ribs that engage the outer portion of front laminations of the stator core, wherein the rear portion of the housing includes a plurality of elongated axial ribs that engage the outer portion of rear laminations of the stator core, and wherein each of the substantially axial air passages is provided as an unobstructed air channel extending between adjacent axial ribs and through the openings in the center laminations of the stator core.

2. The electric machine of claim 1 wherein the center laminations of the stator core are positioned between front laminations and rear laminations of the stator core, the center laminations having a greater diameter than the front laminations and the rear laminations.

3. The electric machine of claim 2 wherein the center laminations are substantially centered between the front laminations and the rear laminations of the stator core.

4. The electric machine of claim 1 further comprising a rectifier and a regulator mounted on a front end of the electric machine, wherein the front end of the electric machine is defined by a front end of the vehicle.

5. An electric machine for a vehicle comprising:
a housing;
a rotor positioned within the housing and configured to rotate about an axis;
a stator positioned between the rotor and an outer wall of the housing, the stator including a core comprising a front end, a rear end, an inner portion and an outer portion surrounding the inner portion, the stator further including stator windings positioned on the inner portion of the stator core, wherein the outer portion of the stator core includes a plurality of axial grooves with fasteners extending along the axial grooves;
a plurality of substantially axial air passages extending from the front end to the rear end of the stator core, the plurality of substantially axial air passages positioned between the inner portion of the stator core and the housing; and
complimentary axial grooves formed on an inner surface of the housing, wherein the fasteners are elongated bolts positioned in channels formed by the axial grooves in the outer surface of the stator core and the complimentary axial grooves in the inner surface of the housing.

6. The electric machine of claim 1 wherein the housing includes a front face and a rear face with no air holes formed in the housing between the front face and the rear face, and wherein the electric machine is configured to split an inlet stream of air passing through the front face into
a first stream of air that flows through the plurality of substantially axial air passages positioned along the outer portion of the stator core, and
a second stream of air that flows through the rotor.

7. The electric machine of claim 6 wherein the electric machine is further configured to recombine the first stream of air and the second stream of air into an exhaust stream of air that flows through the rear face of the electric machine.

8. The electric machine of claim 7 further comprising a fan positioned at a rear end of the housing and configured to draw the exhaust stream of air out of the housing and blow the exhaust stream of air away from the housing.

9. A method of cooling an electric machine in a vehicle including a front end and a rear end, the method comprising:
receiving an inlet stream of air through a front end of the electric machine;
directing the stream of air over a rectifier and a regulator positioned at the front end of the electric machine
splitting the inlet stream of air into a first stream of air and a second stream of air flowing through the electric machine, the first stream of air flowing between an outer surface of a stator core and a non-porous outer wall of a housing, the second stream of air flowing through a rotor positioned radially inward from the stator core; and
exhausting the first stream of air and the second stream of air through a rear end of the electric machine.

10. The method of claim 9 wherein the inlet stream of air is received a plurality of inlet ports in a front face of the electric machine.

11. The method of claim 9 wherein the first stream of air and the second stream of air are exhausted through a plurality of exit ports in a rear face of the electric machine.

12. The method of claim 9 wherein a fan at the rear end of the electric machine is used in exhausting the first stream of air and the second stream of air through the rear end of the electric machine.

13. The method of claim 9 wherein the first stream of air flows through a plurality of substantially axial air passages positioned between the outer wall of the housing and the outer surface of the stator core.

14. The method of claim 9 wherein the front end of the electric machine includes a front face with inlet ports that are open to the front end of the vehicle and the rear end of the electric machine includes a rear face with inlet ports that are open to the rear end of the vehicle.

15. An electric machine for a vehicle, the electric machine comprising:
a rotor configured to rotate about an axis;
a stator positioned radially outward from the rotor, the stator including a stator core with a front end, a rear end, an inner portion configured to retain stator windings and an outer portion surrounding the inner portion;
a housing with the rotor and the stator retained within the housing, the housing including a front face with a plurality of air inlet holes, a rear face with a plurality of air outlet holes, and a non-porous outer wall positioned between the front face and the rear face such that the housing is void of air passages between the front face and the rear face; and
a plurality of air passages extending along the outer portion of the stator core between the front end and the rear end of the stator core; and
a rectifier and a regulator mounted on a front end of the electric machine between the front face of the housing and the front end of the stator core, the front end of the electric machine defined by a front end of the vehicle.

16. The electric machine of claim 15 wherein the rotor is coupled to a rotor shaft that extends along the axis and the rotor shaft is coupled to a pulley at the front end of the electric machine.

17. The electric machine of claim 15 wherein the rectifier and the regulator are provided within an electronics package.

18. The electric machine of claim 15 wherein the plurality of air passages extending along the outer portion of the stator core are substantially axial air passages, the plurality of substantially axial air passages positioned between the inner portion of the stator core and the housing, the substantially axial air passages extending through openings in center laminations of the stator core.

19. The electric machine of claim 18 wherein the electric machine is configured to split an inlet stream of air passing through the front face into
- a first stream of air that flows through the plurality of substantially axial air passages positioned along the outer portion of the stator core, and
- a second stream of air that flows through the rotor.

20. The electric machine of claim 19 further comprising a fan positioned at a rear end of the housing and configured to draw an exhaust stream of air out of the housing and blow the exhaust stream of air away from the housing.

* * * * *